United States Patent [19]

Sakai et al.

[11] 3,893,949

[45] July 8, 1975

[54] CATALYSTS FOR USE IN CONVERSION OF GASES AND METHODS OF MANUFACTURING THEM

[75] Inventors: Toshiyuki Sakai, Funabashi; Kazuhide Miyazaki, Tokyo; Yutaka Ushimaru, Tokyo; Michiaki Yamamoto, Tokyo, all of Japan

[73] Assignee: Mitsui Mining & Smelting Co., Ltd., Tokyo, Japan

[22] Filed: July 26, 1972

[21] Appl. No.: 275,325

[30] Foreign Application Priority Data
July 28, 1971  Japan............................. 46-55984
July 31, 1971  Japan............................. 46-57795

[52] U.S. Cl. ............... 252/454; 252/456; 252/457; 252/458; 252/460; 252/463; 252/464; 252/465; 252/466 R; 252/471; 252/473; 252/477 R
[51] Int. Cl. ..................... B01j 29/00; B01j 35/00
[58] Field of Search ........... 252/463, 471, 472, 473, 252/477 R, 454, 460; 204/49

[56] References Cited
UNITED STATES PATENTS

| | | | |
|---|---|---|---|
| 2,742,437 | 4/1956 | Houdry | 252/471 X |
| 3,061,525 | 10/1962 | Grazen | 204/16 X |
| 3,228,892 | 1/1966 | Cole et al. | 252/463 |
| 3,254,966 | 6/1966 | Bloch et al. | 252/477 R |
| 3,268,424 | 8/1966 | Brown et al. | 204/49 X |

*Primary Examiner*—Carl F. Dees
*Attorney, Agent, or Firm*—Woodhams, Blanchard and Flynn

[57] ABSTRACT

Catalysts for use in conversion of gases containing carbon monoxide and/or hydrocarbons such as waste gases arising from automobiles and the like, which are characterized by containing particles of catalytic metal oxide(s) such as copper oxide(s), iron oxide(s), chromium oxide(s), nickel oxide(s), cobalt oxide(s), zinc oxide, lead oxide(s), bismuth oxide(s), etc. effective for oxidizing carbon monoxide, hydrocarbons, and the like and plated with such metal(s) as copper, iron, nickel, cobalt, chromium, tin, silver, etc. by such means as electroless plating, electroplating, etc.; and relevant methods of manufacturing these catalysts. relevant methods of manufacturing these catalysts.

19 Claims, 4 Drawing Figures

3,893,949

CATALYSTS FOR USE IN CONVERSION OF GASES AND METHODS OF MANUFACTURING THEM

BACKGROUND OF THE INVENTION a. Field of the Invention

The present invention relates to catalysts suitable for use in conversion of gases containing carbon monoxide and/or hydrocarbons—particularly, catalysts having a remarkably improved catalytic activity, heat resistivity and mechanical strength and suitable for use in purification of waste gases arising from automobiles, in conversion of gases having the foregoing components generated in the field of chemical industry and so on, and the methods of manufacturing such catalysts.

b. Description of the Prior Art

Catalysts for use in purification of waste gases arising from automobiles are required to possess catalytic activity at low temperature as well as heat resistivity. The reason is that, inasmuch as the catalyst for said purpose is supposed to effect the purification even when the engine is in a cold state such as at the time of its starting, while it must withstand a high temperature because the catalyst bed is apt to be exposed to a considerably high temperature depending on the running conditions of the automobile concerned, any catalyst cannot serve for practical use unless it meets the foregoing two requirements. As catalysts for use in purification of waste gases arising from automobiles, there have heretofore been proposed a variety of metal oxides, such as manganese oxides(s), zinc oxide, lead oxide(s), bismuth oxide(s) and mixtures of these oxides. These metal oxides in the prior art, however, are still defective as a practical catalyst in that the catalytic effect can be displayed but in a narrow range of optimum temperature, the heat resistivity is poor and the span of life is short. The same metal oxides as employed for the foregoing catalysts may be also applied to catalysts for use in conversion of various gases containing carbon monoxide and/or hydrocarbons like said waste gases arising from automobiles, but, even on this occasion, these catalysts are required to have a longest possible span of life.

SUMMARY OF THE INVENTION

One object of the present invention is to provide catalysts for use in conversion of gases, which are capable of retaining an excellent activity of oxidizing carbon monoxide and hydrocarbons at various temperatures in a wide range covering low temperature and high temperature, along with methods of manufacturing such catalysts.

Another object of the present invention is to provide catalysts for use in conversion of gases, which are possessed of satisfactory heat resistivity, along with methods of manufacturing such catalysts.

A further object of the present invention is to provide catalysts for use in conversion of gases, which are long durable, along with methods of manufacturing such catalysts.

The inventors of the present invention have conducted a series of researches for years with a view to developing practical catalysts to make up for the defects of the conventional catalysts and have discovered that the application of a special surface treatment to the aforementioned metal oxide(s) having catalytic effect in conversion of carbon monoxide, hydrocarbons, etc. renders gas-converting catalysts containing said metal oxides capable of displaying an excellent catalytic effect even at a low temperature and possessed of a sufficient heat resistivity. The present invention has been achieved on the basis of this finding.

To be precise, the present invention is to provide catalysts for use in conversion of gases, which comprises particles of metal oxide(s) having catalytic effect in oxidation of carbon monoxide, hydrocarbons (HC), etc., the surface of said particles of metal oxide(s) being plated with metal(s) capable of promoting said catalytic effect, coupled with methods of manufacturing such catalysts. As the means of depositing said metal(s) on the surface of said particles of metal oxide(s), there are electroless plating process, electroplating process, dipping process and so on. In the description above and below, the wording 'oxide(s)' stands for 'an oxide or oxides', 'metal(s)' for 'a metal or metals', and so on.

BRIEF DESCRIPTION OF THE DRAWING

Referring to the appended drawings.

DETAILED DESCRIPTION OF THE INVENTION

Figure 1:
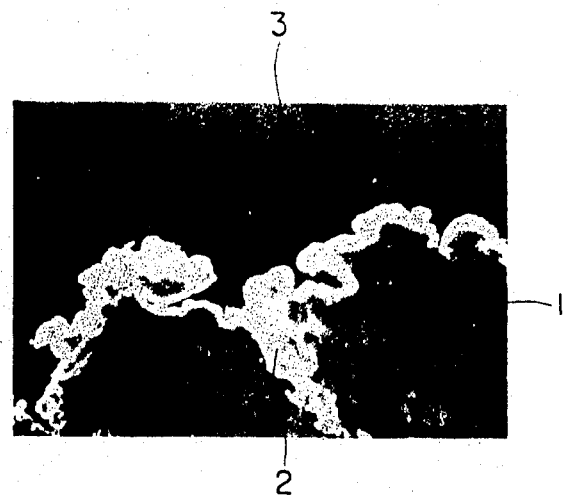
FIG. 1 is an example of the microscopic cross-sectional view (400 magnifications) of a molded catalyst according to the present invention.

To describe the present catalyst more in detail, the gas-converting catalysts under the present invention are catalysts comprising plated particles obtained by depositing at least one member selected from the group consisting of copper, iron, nickel, cobalt, chromium, tin and silver on the particles of at least one member selected from the undesirable phenomena consisting of manganese oxides, copper oxides, iron oxides, chromium oxides, area oxides, cobalt oxides, bismuth oxides, zinc oxide, lead oxides and compounds containing at least one member selected from the group consisting of these oxides, as an essential component thereof.

The general inferiority of the metal oxide catalysts in heat resistivity is considered attributable to the fact that a prolonged exposure of their various components such as principal catalytic component, promotor binder, etc. to a high temperature cause their independent recrystallization, deformation, transformation or mutual chemical reaction or mutual fusion thereof entailing phenomena such as coarseness of crystals and decrease in specific surface are thereof, concealment of effective catalytic components, and so on. But, the gas-converting catalysts according to the present invention are absolutely free from such tendencies.

The working mechanism of metal(s) deposited on the particles of metal oxide(s) according to the present invention is yet to be theoretically clarified: it is presumed, however, that these metal(s) are plated only on the active sites for plating lying scattered over the surface of the particles of metal oxide(s) as if wedges were driven here and there on the surface of the particles of metal oxide(s), to thereby check recrystallization or deformation of the metal oxide(s) due to heating a high temperature and interrupt contact and fusion with the promoter, binder, etc., and, as a result, the heat resistivity gets enhanced. Further, contrary to the conventional catalysts wherein the components thereof ar just physically admixed to be in the state of loosely contacting with each other by their surfaces, the plating treatment according to the present invention closely combines the metal oxide with the plated metal so that the effect of promoting the catalytic efficiency of the metal may be conspicuously demonstrated.

The metal oxides applicable to the present invention include manganese oxides, namely, $Mn_2O_3$, $Mn_3O_4$, etc., various kinds of copper oxides, iron oxides, chromium oxides, nickel oxides, cobalt oxides, bismuth oxides, lead oxides, and zinc oxide and various compounds containing these oxides, such as $FeO.SiO_2$, $ZnO.Al_2O_3$ and the like. Any of the foregoing metal oxides, when employed individually or in the form of a mixture of plural oxides, can manifest a certain degree of catalytic efficiency in oxidation of such gases as carbon monoxide, hydrocarbons and the like or waste gases arising from automobiles and so on containing these gases. The above defined metal oxides are hereinafter generically called catalytic oxide(s). The promoters and/or binders applicable to the present invention include alumina, silica, magnesia, etc.: they are added to the foregoing catalytic oxide(s) in the state of powder or particles, or in the form of alumina cement, alumina-sol, silica-sol, etc. The method of depositing the metal onto the particles of catalytic oxide(s) is the same as the electroless plating process to be applied to the ordinary non-conductive substances such as plastics. To be precise, the particles of catalytic oxide(s) are first treated with an aqueous solution containing stannous chloride for sensitizing, and are thereafter subjected to activating treatment with an aqueous solution containing a noble metal salt such as palladium chloride and silver nitrate. Subsequently, the thus treated particles of catalytic oxide(s) are subjected to electroless plating with a metal capable of promoting the catalytic efficiency of said catalytic oxide(s), such as Cu, Fe, Ni, Co, Cr, Sn, Ag, etc. Referring to electroless copper plating, for instance, when said particles are dipped or immersed in a plating liquid containing copper sulfate, potassium sodium tartrate, caustic soda, sodium carbonate and formalin, copper deposits onto the active sites for plating on the surface of particles of catalytic oxide(s) treated for activation and grows with the lapse of time. The plating liquid for use in nickel-plating is composed of, for instance, nickel chloride, sodium citrate, ammonium chloride and sodium hypophosphite. And, the plating liquid for use in cobalt-plating includes, for instance, a liquid comprising cobalt chloride, potassium sodium tartrate, ammonium chloride and sodium hypophosphite. The quantity of metal to be deposited can be controlled by adjusting the temperature of the plating bath, time of treatment, etc. and may be appropriately chosen by taking into consideration the conditions of gases to be treated, such as the composition, concentration, temperature, etc. thereof and the extent of conversion required; generally speaking, it is appropriate to be in the range of 0.1 ~ 10 wt% against the catalytic oxide(s) to be plated therewith. Deviation from this range often leads to insufficiency of activity at low temperatures and heat resistivity, resulting in failure to obtain the intended catalysts.

In case the aforesaid metal oxide(s) like alumina, silica, magnesia, etc. are applied to the catalysts under the present invention as the promoter, they may be applied in the form of non-plated particles or in the form of plated (in part or entirely) particles by electroless plating.

The molding of the catalysts of the present invention is usually performed by the method of compacting either upon mixing or without mixing the binder or the method of compacting to be followed by calcination; however, any of the conventional methods for use in molding catalysts, such as the pelletizing method, the method of extruding a water-containing kneaded mixture to be followed by cutting into tablets, the method of coating a catalyst mixed with the binder onto an appropriate carrier, and so forth, is also applicable.

The catalysts according to the present invention are catalysts which can be obtained by the simple method of applying electroless plating to the particles of catalytic oxide(s) or to both of the particles of catalytic oxide(s) and the particles of promoter(s), are capable of displaying a high catalytic activity even at a low temperature in converting waste gases arising from automobiles or gases containing carbon monoxide and/or hydrocarbons and superior in heat resistivity as well as durability, are industrially profitable as they are suited for mass production at low cost, can contribute greatly to prevention of the air pollution, and promise utility value also in the field of chemical industry.

The catalysts according to the present invention are as set forth above, and they prove to be sufficiently novel and useful. And yet, on the basis of the foregoing catalysts, the inventors of the present invention have accomplished further improved catalysts which are identical with the former in the fundamental principle that a specific metal is to be deposited onto the surface of the particles of catalytic oxide(s) but are possessed of aspects somewhat different from the former. In other words, these catalysts are molded catalysts prepared by making a metal capable of promoting the catalytic efficiency of catalytic oxide(s) deposit on the surface and interface of the component particles of the molded catalysts comprising catalytic oxide(s). The metal oxides to function as the catalyst and/or promoter and the metals to promote the catalytic efficiency of said metal oxide(s) to be employed on this occasion are the same as those described in the foregoing.

The present molded catalysts have a improved catalytic activity, heat resistivity and also mechanical strength by virtue of the deposition of a highly active thin layer of a metal capable of promoting the catalytic efficiency of catalysts onto the surfaces and interfaces of the particles of catalytic oxide(s) or the particles of both of the catalytic oxide(s) and the promoter(s) constituting said moldings.

FIG. 1 in the appended drawings is a microscopic cross-sectional view (400 magnifications) of an example of the molded catalysts according to the present invention, wherein the numeral reference 1 denotes the particles of manganese sesquioxide as the catalyst, 2 denotes the copper deposited by electroless plating as the metal to promote the catalytic efficiency, and 3 denotes the resin inlaid with the sample of the present molded catalysts. This microphotograph shows that copper has been deposited not only on the external surfaces of the catalyst particles but also on the interfaces between said particles.

These molded catalysts under the present invention are possessed of an excellent mechanical strength, not to speak of satisfactory catalytic activity as well as heat resistivity. Although the reason why the mechanical strength gets so much enhanced is yet to be theoretically clarified, it is presumed that the catalytic efficiency promotive metal deposits around the particles of catalytic oxide(s) (or particles of both of the catalytic oxide(s) and the promoter(s) as occasion demands) and makes them adhere firmly to one another. These molded catalysts having the above described structure are usually manufactured by such methods as follows:

1. The method wherein the catalytic oxide(s) or a mixture of the catalytic oxide(s) and the promoter(s) as occasion demands is subjected to compacting and the resulting moldings are subjected to electroless plating to make a catalytic efficiency promotive metal deposit thereon and therein.

2. In case of catalytic oxide(s) possessed of electric conductivity such as manganese dioxide, manganese sesquioxide, cuprous oxide, lead peroxide, zinc oxide, magnetite and so on, the method wherein the said catalytic oxide(s) or a mixture of the catalytic oxide(s) and the promoter(s) as occasion demands is mixed with the powder of an electrochemically base metal such as Fe, Zn and the like is subjected to compacting and the resulting moldings are dipped or immersed in an aqueous solution containing the soluble salt of a metal which is capable of promoting the catalytic efficiency and is electrochemically nobler than the foregoing metal. According to this method, the reaction to be effected is not a mere displacement reaction between said base metal and noble metal, but is an electrolytic reaction in which the base metal serves as the anode and the particles of the electrically conductive metal oxide(s) contacting with said base metal serves as the cathode, and therefore, the surface of said particles of metal oxide(s) are deposited with said noble metal.

3. In case of catalytic oxide(s) possessed of electric conductivity like the foregoing case (2), the method wherein the moldings of said catalytic oxide(s) or the moldings of a mixture of said catalytic oxide(s) and the promoter(s) as occasion demands are employed for the cathode while an aqueous solution of the salt of catalytic efficiency promotive metal is employed as the electrolyte to thereby effect electrolysis.

In any of the above methods of manufacturing the present catalysts, for the purpose of making the catalytic efficiency promotive metal deposit onto the surface of the catalyst particles present inside the molded catalysts, the reaction may be effected under an appropriately reduced pressure according to the fineness of structure of the moldings.

The quantity of the catalytic efficiency promotive metal to be deposited can be appropriately chosen by taking into consideration the conditions of gases to be treated, the extent of conversion required, the oscillation to be inflicted on the catalysts and so forth; generally speaking, however, it is appropriate for said quantity to be in the range of 0.1 ~ 10 wt% against the catalytic oxide(s) contained in the moldings, the same as previously defined. Deviation from this range is apt to lead to insufficiency of catalytic activity, heat resistivity or mechanical strength.

The molded catalysts under the present invention manufactured by the foregoing methods may look like the so-called impregnated catalysts in the prior art which are prepared through the impregnation process. However, the structure of the present molded catalyst is fundamentally different from that of the conventional impregnated catalyst in that, while the latter comprises a carrier which has no direct bearing on the catalytic efficiency per se and yet accounts for the greater part of the total weight and volume thereof, the former consists exclusively of catalyst(s) (or catalyst(s) and promoter(s) as occasion demands) together with a metal capable of promoting the catalytic efficiency of said catalyst(s). Consequently, there is brought about a marked difference between the catalytic activities of the former and the latter.

As will be understood from the above explanation, the molded catalysts according to the present invention are so superior in catalytic activity, heat resistivity and also mechanical strength that they are especially effective for use in, for instance, oxidation/purification of waste gases arising from automobiles wherein the catalysts employed are supposed to be not only quantitatively limited but also subjected to constant oscillation. However, the use of the present catalysts are not limited to the foregoing.

DESCRIPTION OF THE PREFERRED EMBODIMENTS

Hereunder will be given some embodiments of the present invention.

EXAMPLE 1.

Subsequent to imparting sensitivity to the particles of manganese sesquioxide by treating them with an aqueous solution having the concentration of 10 g/l of stannous chloride and 10 cc/l of 35% hydrochloric acid at the room temperature for 2 minutes, activating treatment of said particles with an aqueous solution having the concentration of 0.2 g/l of silver nitrate was conducted at the room temperature for 2 minutes. When the thus treated particles were further treated in an electroless copper-plating bath comprising 20 g/l of copper sulfate, 70 g/l of potassium sodium tartrate, 9 g/l of caustic soda, 4 g/l of sodium carbonate and 20 g/l of 37% formalin at the room temperature for 30 minutes, said manganese oxide particles were plated with 0.5 wt% of copper against the manganese oxide.

EXAMPLE 2.

Subsequent to imparting sensitivity to the particles of red oxide of iron followed by the activating treatment in the same ways as in Example 1, said particles were further treated in an electroless nickel-plating bath comprising 30 g/l of nickel chloride, 100 g/l of sodium citrate, 30 g/l of ammonium chloride and 10 g/l of sodium hypophosphite at 95°C for 1 hour. As a result, the particles of red oxide were plated with 2 wt% of nickel against the red oxide.

EXAMPLE 3.

Subsequent to imparting sensitivity to the particles of zinc white followed by the activating treatment in the same ways as in Example 1, said particles were further treated in an electroless cobalt-plating bath comprising 50 g/l of cobalt chloride, 600 g/l of potassium sodium tartrate, 100 g/l of ammonium chloride and 35 g/l of sodium hypophosphite at 90°C for 2 hours. As a result, the particles of zinc white were plated with 2 wt% of cobalt against the zinc white.

EXAMPLE 4.

The exhaust system of the engine dynamometer having a 1,600 cc automobile engine was loaded with catalysts under the present invention comprising the metal oxide(s) plated in the same way as in Examples 1 ~ 3 above, whereby the efficiencies of the present catalysts were compared with those of the conventional catalysts having similar composition except for application of non-plated metal oxide(s) instead of the plated metal oxide(s). The results were as shown in Table-1 below, which indicate that the catalysts according to the present invention are possessed of superior catalytic properties such that (1) they can start reacting at a temperature lower than the conventional catalysts by about 50° ~ 60°C and therefore contribute a good deal to the reduction of time necessary for starting the purification, (2) although the temperature of catalysts attains to as high as 800° ~ 900°C at the time of cruise of the engine dynamometer, the catalytic efficiency shows but a minor decrease even after 200 hours' run; that is, they are possessed of much enhanced heat resistivity and prolonged life spans retaining the catalytic activity.

EXAMPLE 5.

By bringing gases containing carbon monoxide or propane into contact with catalysts comprising a plated metal oxide according to the present invention for 0.5 ~ 5 seconds, the conversion ratio of respective gases were measured. The results were as shown in Table-2 below, and the present catalysts have proved superior in catalytic properties to the conventional catalysts having the same composition as the present catalysts except for application of non-plated metal oxide instead of plated metal oxide, such that:

1. the temperature for initiating the reaction is lower;
2. the catalytic activity can be retained longer and the life span has been prolonged.

Table 1

Comparative Efficiencies of Various Catalysts under the Present Invention and Conventional Catalysts

| No. | Composition of catalyst | Time of contact between waste gas and catalyst (sec.) | Temperature of catalyst for initiating reaction (°C) | Gas conversion ratio in the early stage of use of catalyst | | Gas conversion ratio after 200 hrs' use of catalyst | |
|---|---|---|---|---|---|---|---|
| | | | | CO(%) | HC(%) | CO(%) | HC (%) |
| 1 | compacted catalyst wherein $MnO_2$ (plated with 0.5% of Ni): $Bi_2O_3$: alumina binder= 50:20:30 | 1.5 ~ 2.0 | 150 (200) | 93 (91) | 78 (72) | 88 (77) | 72 (63) |
| 2 | compacted catalyst wherein $MnO_2$:ZnO (plated with 3% of Fe): alumina binder =40:25:35 | 0.1 ~ 0.3 | 140 (200) | 83 (76) | 74 (70) | 73 (64) | 71 (60) |
| 3 | compacted and calcinated catalyst wherein $Mn_2O_3$ (plated with 0.5% of Cr :ZnO:alumina binder=50:15:35 | 0.1 ~ 0.3 | 160 (210) | 76 (70) | 70 (62) | 62 (53) | 60 (50) |
| 4 | compacted and calcinated catalyst wherein $Mn_2O_3$:ZnO (plated with 2% of Ni): $Fe_2O_3$:alumina binder=55:10:15:20 | 1.5 ~ 2.0 | 170 (210) | 92 (90) | 76 (72) | 83 (67) | 71 (56) |
| 5 | compacted and calcinated catalyst wherein CuO :$Fe_2O_3$ (plated with 2% of Cu): $Cr_2O_3$:$\gamma$-$Al_2O_3$= 30:20:20:30 | 1.5 ~ 2.0 | 120 (180) | 96 (92) | 84 (80) | 93 (83) | 78 (69) |
| 6 | compacted and calcinated catalyst wherein CuO (plated with 0.5% of Co):$Fe_2O_3$: $Cr_2O_3$:$\gamma$-$Al_2O_3$= 20:45:15:20 | 0.1 ~ 0.3 | 120 (180) | 88 (78) | 81 (73) | 77 (65) | 73 (62) |

Remarks:
(1) The bracketed numerical value represents the value in case of application of nonplated metal oxide, i.e., in case of conventional catalysts.
(2) The numerical value of HC is calculated from the concentration in terms of n-hexane.
(3) "%" of column 2 is "wt%".

Table-2

Comparison of Efficiencies of Catalysts under the Present Invention and Conventional Catalysts

| No. | Composition of catalyst | Composition and temperature of gas to be treated | Time of contact between gas and catalyst (sec) | Temperature of catalyst for initiating reaction (°C) | Gas conversion ratio in the early stage of use of catalyst | | Gas conversion ratio after 400 hrs' use of catalyst | |
|---|---|---|---|---|---|---|---|---|
| | | | | | CO(%) | HC(%) | CO(%) | HC(%) |
| 7 | compacted catalyst wherein $MnO_2$ (plated with 0.5% of Cu): ZnO:$Fe_2O_3$:$\gamma$-$Al_2O_3$ = 40:20:20:20 | $C_3H_8$: 1500ppm $O_2$: 1.5% $N_2$: balance 400 ~ 500°C | 1.0 ~ 5.0 | 140 (170) | — | 98 (90) | — | 95 (80) |
| 8 | compacted and calcinated catalyst wherein $Mn_2O_3$:CuO: $Fe_2O_3$ (plated with 2% of Ni):alumina binder=30:30:30:10 | CO: 2.5% $O_2$: 4% $N_2$: balance 250 ~ 400°C | 0.5 ~ 2.5 | 120 (160) | 97 (91) | — | 92 (80) | — |

Remarks:
(1) The bracketed numerical value represents the value in case of application of non-plated metal oxide.
(2) "%" of column 2 is "wt%".

EXAMPLE 6.

Figure 2:
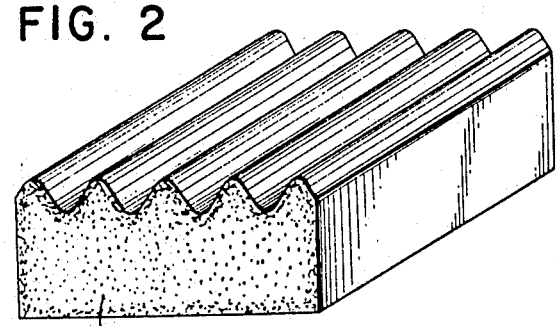
FIG. 2 is a perspective view of an example of the molded catalyst according to the present invention.

A variety of mixtures were prepared by mixing the catalytic oxides, namely, manganese oxide(s), zinc oxide, copper oxide(s), chromium oxide(s), iron oxide(s) and bismuth oxide(s), with metallic zinc powder or metallic iron powder respectively at the ratio shown in Table-3 below (provided that No. 4 did not contain any metallic powder). These mixtures, upon further mixing 20 parts by weight of alumina cement to 80 parts by weight of each of them, were respectively packed in a die and molded into plates having corrugated top surface such as shown in FIG. 2 by means of a hydraulic press under the pressure of 2 t/cm². Subsequently, the resulting moldings were subjected to curing by dipping in water for about 20 hours and then natural drying in the air. The thus dried moldings were further subjected to treatment for metal deposition in various ways as shown in Table-3 below and then dried again.

The respective mechanical strength of these catalyst moldings subjected to the metal deposition and not subjected to such treatment were measured, and the results were as shown in Table-3. This showing verifies the marked enhancement of the strength of the catalyst moldings according to the present invention.

Figure 3:
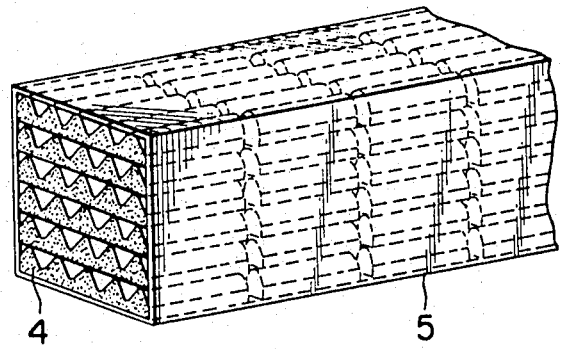
FIG. 3 and FIG. 4 are respectively a perspective view and a longitudinal-sectional view of two examples of the packing structure (in a catalyst container) of a plurality of molded catalysts shown in FIG. 2.
Figure 4:
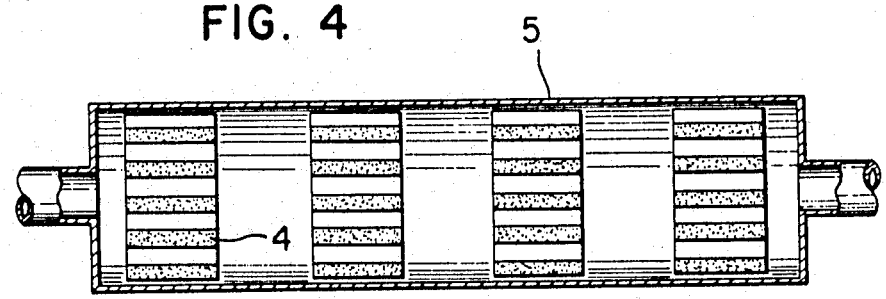

In order to measure the efficiencies of the molded catalysts under the present invention in conversion of carbon monoxide (CO), propane ($C_3H_8$) or CO and hydrocarbons (HC) in terms of n-hexane (n—$C_6H_{14}$) contained in the waste gases arising from automobiles, these gases were introduced into the catalyst container 5 packed with the present molded catalysts 4 assembled into block structures as shown in FIG. 3 and FIG. 4. The conversion ratio was figured out from the difference between the concentration of a gas before entering the catalyst bed and the concentration of said gas after passing through the catalyst bed as measured by means of the non-despersive infrared spectrometer (NDIR) and the gas chromatograph analyser. The results of tests therefor were as shown also in Table-3, verifying a marked enhancement of the gas conversion efficiency of the molded catalyst according to the present invention.

Table-3

| No. | Components (wt%) | Metal deposition treatment | Quantity of deposited metal (against catalytic oxides) (wt%) | Strength of the present molded catalyst | | Time of contact between gas and catalyst bed (sec.) | Composition and temperature of gas introduced into catalyst bed | Gas conversion ratio (%) | | |
|---|---|---|---|---|---|---|---|---|---|---|
| | | | | strength (Kg/cm²) | ratio of improvement (%) | | | CO | $C_3H_8$ | HC |
| 1 | $MnO_2$: 70 $Bi_2O_3$: 10 ZnO: 5 Fe powder: 15 | dipping in a solution of stannous chloride (100) g/l) at 60°C for 40 min. | Sn 2.5 | 1,400 (686) | 204 (100) | 0.1~0.3 | CO: 2% $O_2$: 3% $N_2$: balance 250 ~ 350°C | A:98 B:90 A:(95) B:(75) | — | — |
| 2 | $MnO_2$: 70 | dipping in a solution of | Cu 2.0 | 1,505 (686) | 219 (100) | 1.0~5.0 | $C_3H_8$: 1,000 ppm | — | A:90 B:85 | — |

Table-3 -Continued

| No. | Components (wt%) | Metal deposition treatment | Quantity of deposited metal (against catalytic oxides) (wt%) | Strength of the present molded catalyst strength (Kg/cm²) | ratio of improvement (%) | Time of contact between gas and catalyst bed (sec.) | Composition and temperature of gas introduced into catalyst bed | Gas conversion ratio (%) CO | C₃Hₓ | HC |
|---|---|---|---|---|---|---|---|---|---|---|
| | ZnO: 20 Zn powder: 10 | copper acetate (70 g/l) and platinum chloride (0.01 g/l) at 30°C for 20 min. under reduced pressure (30 m/m Hg) | | | | | O₂: 1% N₂: balance 400 ~ 500°C | B:(60) | A:(80) | |
| 3 | MnO₂: 60 Cr₂O₃: 10 CuO: 10 Fe powder: 20 | dipping in a solution of stannous sulfate (30 g/l), cobalt sulfate (50 g/l) and silver nitrate (1 g/l) at 60°C for 30 min. | Sn 1.5 Co 2.5 Ag 0.2 | 1,085 (686) | 158 (100) | 1.0~1.5 | Waste gas from 1600 cc engine CO: 22 g/mile HC: 1.5 g/mile 250 ~ 400°C | A:90 B:85 A:(86) B:(72) | — | A:71 B:65 A:(59) B:(47) |
| 4 | MnO₂: 70 Bi₂O₃: 15 Fe₂O₃: 15 | after pretreatment for electroless plating (imparting sensitivity and activation), dipping in a solution of nickel sulfate (30 g/l) and sodium hypophosphite (10 g/l) under reduced pressure (30 m/m Hg) | Ni 0.4 | 1,548 (686) | 226 (100) | 1.5~2.0 | CO: 1% O₂: 2% N₂: balance 150 ~ 300°C | A:98 B:92 A:(95) B:(83) | — | — |
| 5 | Mn₂O₃: 60 Fe₂O₃: 15 CuO: 15 Fe powder: 10 | dipping in a solution of copper acetate (50 g/l), stannous chloride (30 g/l) and nonionic surface active agent (0.1 ml/l) at 50°C for 30 min under reduced pressure (20 m/m Hg) | Cu 6.5 Sn 1.0 A:(60) | 1,525 (686) A:(86) | 222 (100) | 0.1~0.3 | Waste gas from 2,000 cc engine CO: 25 g/mile HC: 1.7 g/mile 250 ~ 400°C | A:88 B:80 A:(86) B:(70) | — | A:73 B:70 A:(60) B:(53) |
| 6 | Mn₂O₃: 60 Fe₂O₃: 20 Cr₂O₃: 10 Fe Powder: 10 | applicating D.C. electricity for 15 min at cathode current density of 100 mA/dm², the cathode being the compacted catalyst and the electrolyte being a solution of copper sulfate (100 g/l) and sulfuric acid (10 g/l | Cu 0.1 | 1,561 (952) | 164 (100) | 1.0~1.5 | waste gas from 2,000 cc engine CO:21 g/mile HC: 1.8 g/mile 400 ~ 500°C | A:95 B:91 A:(85) B:(80) | — | A:70 B:62 A:(63) B:(51) |

Remarks:
(1) The bracketed numerical value represents the value when the metal deposition treatment was not applied.
(2) In the column 'gas conversion ratio', A represents the value in the early stage of use of the catalyst', while B represents the value after 400 hours' use thereof providing that it represents the value after 200 hours' use in case of the waste gases arising from engines.
(3) The value of HC represents the value in terms of n-hexane.

What is claimed is:
1. A method for manufacturing a catalyst composition for oxidizing a gas, which comprises effecting an electroless plating of catalytic oxide selected from the group consisting of manganese oxide, copper oxide, iron oxide, chromium oxide, nickel oxide, cobalt oxide, bismuth oxide, zinc oxide, lead oxide, compounds containing at least one of said oxides and mixtures of said oxides by sensitizing same with an aqueous solution of stannous chloride, then activating same with an aqueous solution of a noble metal salt and then treating same with an electroless plating bath to deposit on the catalytic oxide from 0.1 to 10% by weight, based on the weight of catalytic oxide, of metal capable of promoting the catalytic effect of said catalytic oxide selected from the group consisting of Cu, Fe, Ni, Co, Cr, Sn and Ag.

2. The method of claim 1 wherein the catalytic oxide composition is formed into a molded catalytic shape.

3. The method of claim 2 wherein the forming step is carried out prior to plating the catalytic oxide.

4. The method of claim 1 wherein the catalytic oxide is mixed with a finely divided oxide promoter selected from the group consisting of alumina, silica and magnesia.

5. The method of claim 4 wherein the step of admixture with said oxide promoter is carried out prior to said plating step.

6. The method of claim 4 wherein the step of admixture with said oxide promoter is carried out subsequent to said plating step.

7. The method of claim 7 wherein said plated catalytic oxide is admixed with said unplated catalytic oxide.

8. The method of claim 1 wherein said catalytic oxide or a mixture of said catalytic oxide with an oxide promoter selected from the group consisting of alumina, silica and magnesia is subjected to compacting molding and the resulting molded shape is subjected to electroless plating.

9. A method for manufacturing a catalyst composition for oxidizing a gas, which comprises:
molding a mixture comprising (A) particles of electrically conductive catalytic oxide selected from the group consisting of manganese oxide, copper oxide, iron oxide, chromium oxide, nickel oxide, cobalt oxide, bismuth oxide, zinc oxide, lead oxide, compounds containing at least one of said oxides and mixtures of said oxides, and (B) particles of a first metal, to form a molded catalyst element,
immersing said molded catalyst element in an aqueous solution of a water soluble salt of a second metal which is electrochemically more noble than the first metal and which is effective to promote the catalytic effect of said catalytic oxide, said second metal being selected from the group consisting of Cu, Fe, Ni, Co, Cr, Sn and Ag, the immersing step being carried out in the absence of supplying electrical energy to said solution from an external source and so that said first metal serves as the anode and the electrically conductive catalytic oxide serves as the cathode in said solution, the immersing step being carried out for a period of time effective to deposit electrochemically on said catalytic oxide from 0.1 to 10% by weight, based on the weight of catalytic oxide, of said second metal.

10. A method according to claim 9, in which said catalytic oxide is selected from the group consisting of manganese dioxide, manganese sesquioxide, cuprous oxide, lead peroxide, zinc oxide and magnetite and said first metal is Fe or Zn.

11. A method according to claim 9, wherein said mixture also contains (C) particles of a promoter selected from the group consisting of alumina, silica and magnesia.

12. A method for manufacturing a catalyst composition for oxidizing a gas, which comprises:
molding particles of electrically conductive catalytic oxide selected from the group consisting of manganese oxide, copper oxide, iron oxide, chromium oxide, nickel oxide, covalt oxide, bismuth oxide, zinc oxide, lead oxide, compounds containing at least one of said oxides and mixtures of said oxides, to form a molded catalyst element,
immersing said molded catalyst element in an aqueous electrolyte solution of a salt of a metal which is effective to promote the catalytic effect of said catalytic oxide, said metal being selected from the group consisting of Cu, Fe, Ni, Co, Cr, Sn and Ag, and applying direct current to effect electrolysis employing said catalytic oxide as cathode, for a period of time effective to deposit said metal on said catalytic oxide in an amount of from 0.1 to 10% by weight, based on the weight of said catalytic oxide.

13. A method according to claim 12, in which said catalytic oxide is selected from the group consisting of manganese dioxide, manganese sesquioxide, cuprous oxide, lead peroxide, zinc oxide and magnetite.

14. A method according to claim 12, wherein the catalytic oxide particles are mixed with particles of a promoter selected from the group consisting of alumina, silica and magnesia and that mixture is subjected to said molding step.

15. A catalyst composition made by the process of claim 1.

16. A catalyst composition made by the process of claim 5.

17. A catalyt composition made by the process of claim 8.

18. A catalyst composition made by the process of claim 9.

19. A catalyst composition made by the process of claim 12.

* * * * *

UNITED STATES PATENT OFFICE
CERTIFICATE OF CORRECTION

Patent No. 3,893,949  Dated July 8, 1975

Inventor(s) Toshiyuki Sakai, Kazuhide Miyazaki, Yutaka Ushimaru and Michiaki Yamamoto It is certified that error appears in the above-identified patent and that said Letters Patent are hereby corrected as shown below:

Col. 13, line 7; change "of metal" to ---of a metal---.

Col. 13, line 25; change "Claim 7" to ---Claim 6---.

Col. 14, line 20; change "covalt" to ---cobalt---.

Signed and Sealed this twenty-fifth Day of November 1975

[SEAL]

Attest:

RUTH C. MASON  
Attesting Officer

C. MARSHALL DANN  
Commissioner of Patents and Trademarks